(12) United States Patent
Vergine et al.

(10) Patent No.: US 6,321,694 B1
(45) Date of Patent: Nov. 27, 2001

(54) PROCESS FOR CONTROLLING THE PHASE OF SWITCHING OF FUEL IN AN INTERNAL-COMBUSTION ENGINE DESIGNED TO OPERATE SELECTIVELY WITH GASOLINE AND GAS

(75) Inventors: Irene Vergine; Giuseppe Miletto; Massimo Ferrera, all of Orbassano (IT)

(73) Assignee: C.R.F. Societa Consortile Per Azioni, Turin (IT)

( * ) Notice: Subject to any disclaimer, the term of this patent is extended or adjusted under 35 U.S.C. 154(b) by 0 days.

(21) Appl. No.: 09/597,087

(22) Filed: Jun. 20, 2000

(30) Foreign Application Priority Data

Jun. 22, 1999 (IT) ............................................. TO99A0536

(51) Int. Cl.[7] ...................................................... F02B 3/00
(52) U.S. Cl. .................... 123/27 GE; 123/525; 123/578; 123/464
(58) Field of Search .............................. 123/27 GE, 525, 123/526, 575, 576, 578, 299, 300, 304, 464, 529, 198 D, 198 DB

(56) References Cited

U.S. PATENT DOCUMENTS

| 5,224,457 | * | 7/1993 | Arsenault et al. ................... 123/526 |
| 5,632,250 | * | 5/1997 | Kato et al. ............................ 123/490 |
| 5,713,336 | * | 2/1998 | King et al. ........................... 123/525 |
| 5,735,253 | * | 4/1998 | Perotto et al. .................. 123/406.47 |
| 5,755,211 | * | 5/1998 | Koch ................................... 123/525 |
| 6,003,478 | * | 12/1999 | Huber .............................. 123/27 GE |
| 6,067,972 | * | 5/2000 | Jaasma ................................. 123/549 |
| 6,145,494 | * | 11/2000 | Klopp ................................... 123/525 |

* cited by examiner

*Primary Examiner*—Willis R. Wolfe
*Assistant Examiner*—Hai Huynh
(74) *Attorney, Agent, or Firm*—Sughrue, Mion, Zinn, Macpeak & Seas, PLLC

(57) ABSTRACT

In an internal-combustion engine designed to operate selectively with gasoline or gas, after each switching of fuel the injectors of the fuel-supply system that has been activated are controlled differently with respect to operation at the normal engine running rate to compensate for the transient phenomena due to the change of fuel.

3 Claims, 1 Drawing Sheet

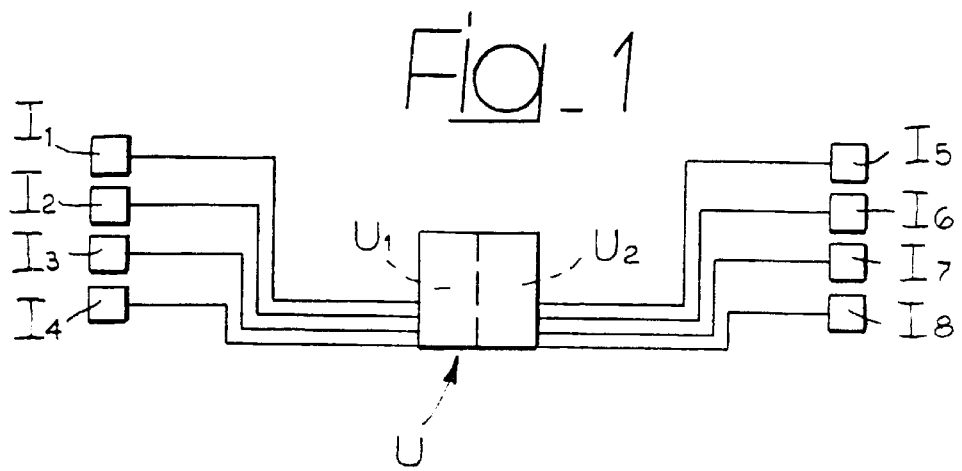
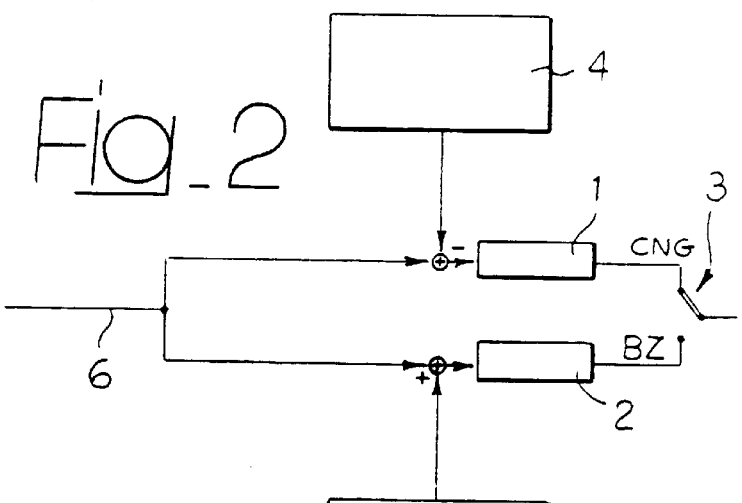
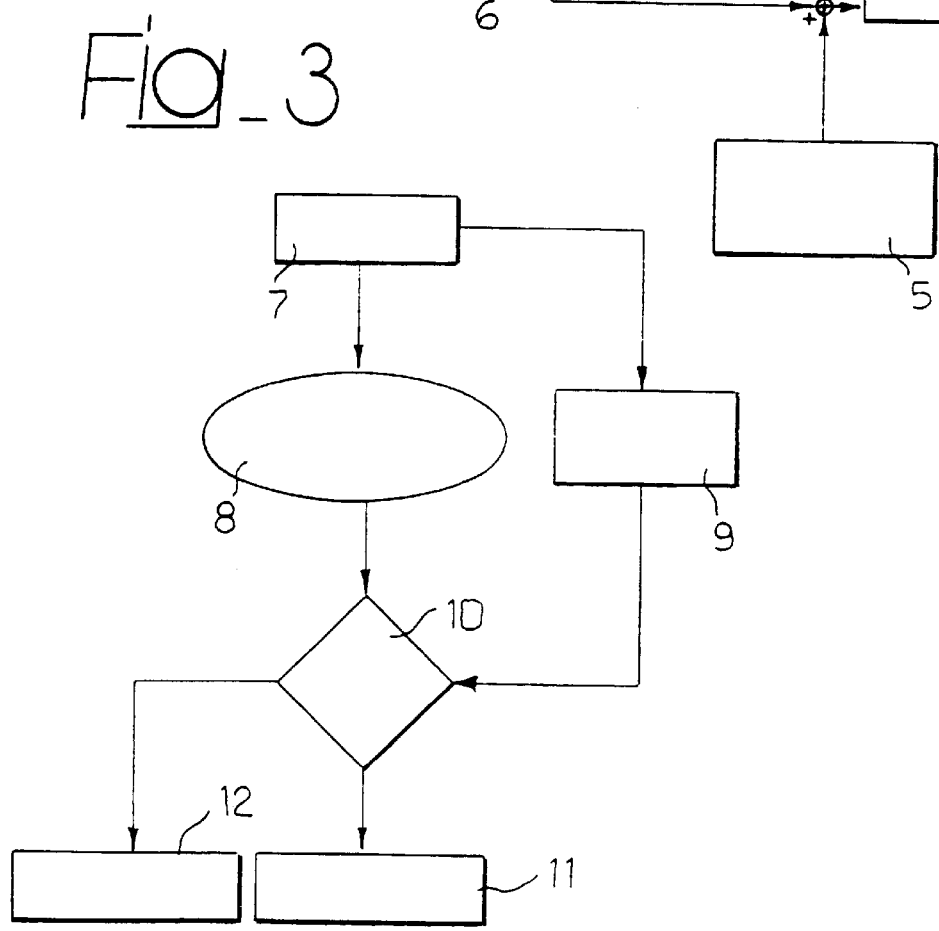

PROCESS FOR CONTROLLING THE PHASE OF SWITCHING OF FUEL IN AN INTERNAL-COMBUSTION ENGINE DESIGNED TO OPERATE SELECTIVELY WITH GASOLINE AND GAS

BACKGROUND OF THE INVENTION

The present invention relates to internal-combustion engines designed to operate selectively with gasoline and gas (for example, methane or LPG), of the type comprising a gasoline-supply system comprising a plurality of electronically controlled gasoline injectors, each of which is associated to one of the cylinders of the engine, a gas-supply system comprising a plurality of electronically controlled gas injectors, each of which is also associated to one of the cylinders of the engine, and electronic means for controlling the gasoline injectors and gas injectors.

The present applicant has already studied and proposed various solutions for internal-combustion engines of the type specified above (see, for example the European patent No. 0801223).

The purpose of the present invention is to provide a process for controlling an internal-combustion engine of the type specified above, which enables prevention of the drawbacks that occur with the engines so far built during the fuel-switching phase, i.e., during switching from gasoline supply to gas supply, or, vice versa, from gas supply to gasoline supply.

One first drawback that occurs during the said switching phase in engines according to the known art is represented by the considerable thermal stresses to which the catalytic converter provided in the engine-exhaust system is subjected on account of the undesired fluctuations in the metering of fuel during the phase of transition from one fuel to the other.

A further drawback that arises in known systems is represented by the possibility that inhomogeneities may occur in the delivery of the torque during the above-mentioned switching phase, with consequent problems from the standpoint of proper drivability of the vehicle.

The problems mentioned above derive from the fact that when the engine is switched from gasoline operation to gas operation, or vice versa, an initial transient phase occurs in which there is a joint presence of the two fuels in the cylinders of the engine. The simultaneous presence in the combustion chambers of the cylinders of the three components air, gasoline and gas gives rise to anomalies in the creation of the mixture. These problems are increased by the different state (liquid and gas) of the two fuels. In particular, in operation of the engine under normal running conditions with gasoline supply, a film of gasoline is deposited on the walls of the fuel supply pipes, the presence of which is important for proper operation of the engine. Vice versa, in operation of the engine with gas supply, proper filling of the combustion chamber is always guaranteed by the volatility of the fuel used. Switching from gasoline supply to gas supply, or vice versa from gas supply to gasoline supply, thus entails additional problems. The drawbacks that derive therefrom in the engines according to the known art are such as to force the adoption, in certain cases, of drastic solutions consisting in allowing the switching operation only when the vehicle is stationary, so as to prevent any possible problem from arising in driving on account of any loss of torque following upon fuel switching when the vehicle is travelling.

SUMMARY OF THE INVENTION

With a view to overcoming all the above problems, the subject of the invention is a process for controlling the fuel-switching phase in an internal-combustion engine designed to operate selectively with gasoline and gas, of the type indicated at the beginning of the present description, characterized in that, whenever a command is issued for fuel switching by means of deactivation of one of the two fuel-supply systems and activation of the other fuel-supply system, the injectors of the fuel-supply system that has been activated are controlled during an initial phase in a different way as compared to the normal engine-running condition so as to compensate for the transient phenomena due to the change of fuel.

More in particular, in the event of switching from gas to gasoline during the aforesaid initial gasoline-operation phase, the gasoline injectors are kept open for a longer time than for the normal engine-running condition with the purpose of enabling fast formation of a deposit of a film of gasoline on the walls of the fuel-supply pipes, whereas, in the case of switching from gasoline to gas during the aforesaid initial phase, the gas injectors are kept open for a shorter time than for the normal engine-running condition until there is complete evaporation of the film of gasoline that has formed on the walls of the pipes in the course of the foregoing gasoline-operation phase.

Thanks to the above characteristics, a linear and uniform operation of the engine is achieved, with consequent good drivability of the vehicle during the fuel-switching phase, even though the vehicle is travelling.

A further problem that has led to the present invention is represented by the safeguarding of a number of components of the motor vehicle that would otherwise be subject to excessive stresses in the event of switching from gasoline supply to gas supply. For instance, in the case of gas systems equipped with a pressure regulator heated by the engine coolant, for temperatures at engine starting in the region of −25 to −30° C., freezing of the coolant in the heating circuit of the pressure regulator could occur, so that operation would no longer be guaranteed, and the pressure regulator itself could get permanently damaged on account of the thermal stresses involved.

With a view to overcoming such a problem, in the preferred embodiment the process according to the invention is further characterized in that, during engine operation, the temperature of at least one predetermined component of the engine is estimated on the basis of a corresponding thermodynamic model, and operation with gas supply is inhibited when the said estimated temperature is outside a predetermined range of acceptability.

Of course, another subject of the invention is an internal-combustion engine designed to operate selectively with gas or gasoline, of the type specified at the beginning of the present description and characterized in that the aforesaid electronic control means are programmed in such a way as to provide the control process described above.

The above-mentioned electronic control means may consist of two electronic control units, one of which is dedicated to controlling the gasoline-supply system, and the other is dedicated to controlling the methane-supply system, or else may consist of a single electronic control unit which is able to manage both fuel-supply systems.

BRIEF DESCRIPTION OF THE DRAWINGS

Further characteristics and advantages of the invention will emerge from the ensuing description with reference to the attached drawings, which are provided purely to furnish a non-limiting example, and in which:

FIG. 1 is a schematic view of the two injector systems, one for gasoline and one for gas, provided in an engine according to the invention; and FIGS. 2 and 3 are two block diagrams illustrating the basic principles of the control process according to the invention.

DETAILED DESCRIPTION OF THE INVENTION

As already specified previously, the invention relates to an internal-combustion engine, typically a multi-cylinder engine, in which a plurality of electronically controlled gasoline injectors ($I_1$–$I_4$) and a plurality of electronically controlled gas injectors ($I_5$–$I_8$) are associated to the various cylinders of the engine.

The constructional details of the engine, of the injectors, and of the systems for supplying fuel to the above-mentioned injectors are not illustrated herein in so far as such items may be built in any known way, and do not in themselves fall within the scope of the present invention. In this connection, reference may be made to the various patent documents filed by the present applicant on the subject (see, for example, the European patent No. 0801223).

As illustrated schematically in FIG. 2, the electronic means for controlling the injectors, which consist of a single control unit U, or of two dedicated control units, $u_1$ and $u_2$, are programmed in such a way that, during an initial phase following immediately upon fuel switching, which is performed by deactivation of one fuel-supply system and activation of the other fuel-supply system, the injectors of the system that is activated are controlled differently than for the normal engine-running condition. In particular, in the case of switching from gas to gasoline, during the above-mentioned initial phase of gasoline operation, the gasoline injectors are kept open for a longer time than for normal engine-running operation so as to enable fast formation of a deposit of a film of gasoline on the walls of the fuel-supply pipes. Instead, in the case of switching from gasoline to gas, during the initial phase the gas injectors are kept open for a shorter time than for normal engine operation until the film of gasoline that has formed on the walls of the pipes in the course of the previous gasoline-operation phase has completely evaporated.

The control criterion described above is presented schematically in FIG. 2, where the blocks 1, 2 indicate respectively the mathematical model of the gas injector and the mathematical model of the gasoline injector that are used by the electronic control unit U (or by the respective control units $u_1$ and $u_2$) for controlling the injection of gas and gasoline during operation of the engine at the normal running rate. The control of switching between gasoline operation (BZ) and gas operation (CNG) is indicated schematically and is designated by the reference number 3. The two blocks designated by 4 and 5 represent the compensatory modification of the criterion for controlling the activated injectors, which is followed by the electronic control unit in order to obtain the results mentioned above. The block designated by 4, which refers to the initial phase following upon activation of gas operation, regards the compensation consisting in reduction in the time of opening of the gas injectors as compared to operation at the normal engine-running rate, with the purpose of enabling evaporation of the deposit of gasoline which had formed on the walls of the fuel-supply pipes in the previous phase, i.e., gasoline operation. The block designated by 5 refers to the compensation that is made in the phase of initial gasoline operation, consisting in an increase in the time of opening of the gasoline injectors as compared to operation under normal engine-running conditions, with the purpose of enabling a fast formation of the deposit of gasoline on the walls of the fuel-supply pipes. The compensations thus achieved determine the total flow of fuel (line 6) during the phase of joint presence of the two fuels following upon fuel switching.

FIG. 3 is a schematic representation of a preferred characteristic of the process according to the invention, consisting, as has already been described, in the inhibition of operation of the engine with gas when the system itself estimates that the thermal state of certain given components of the engine, such as the pressure regulator of the gas-supply circuit, involves an excessive risk for the said components in the case of gas operation. As summarized in the diagram of FIG. 3, the system electronic control unit carries out estimation of the thermal state of one or more given components on the basis of the knowledge of the initial thermal state (block 7) and of a mathematical model of the evolution of the thermal state of the component (block 8). The thermal state thus estimated is compared against a given range of acceptability (block 9). If the outcome of the comparison (block 10) reveals that the thermal state of the component falls within the range of acceptability, the operation of the engine with gas is enabled (block 11), whereas otherwise, operation with gas is inhibited (block 12).

Of course, without prejudice to the principle of the invention, the details of construction and the embodiments may vary widely with respect to what is described and illustrated herein purely for the purpose of providing an example, without thereby departing from the sphere of the present invention.

What is claimed is:

1. A process for controlling the fuel-switching phase in an internal-combustion engine designed to operate selectively with gasoline and gas, said engine being of the type that comprises:
a gasoline supply system comprising a plurality of electronically controlled gasoline injectors ($I_1$–$I_4$), each of which is associated to a respective cylinder of the engine,
a gas supply system comprising a plurality of electronically controlled gas injectors ($I_5$–$I_8$), each of which is associated to a respective cylinder of the engine, and
electronic control means (U; $u_1$, $u_2$) for controlling the injectors of gasoline and injectors of gas ($I_1$–$I_8$), said process wherein whenever a command is issued for fuel switching by means of deactivation of one of the two fuel-supply systems and activation of the other fuel-supply system, the injectors of the fuel-supply system that has been activated are controlled during an initial phase in a different way, as compared to the normal engine-running condition so as to compensate for the transient phenomena due to the change of fuel, wherein during operation of the engine, the temperature of at least one pre-determined component of the engine is estimated on the basis of a corresponding thermodynamic model, and operation with gas supply is inhibited when the said estimated temperature is outside a pre-determined range of acceptability.

2. A process according to claim 1, wherein the gas-supply system comprises a pressure regulator and wherein operation of the engine is inhibited when the aforesaid electronic control unit (U) estimates a value of the temperature of the aforesaid pressure regulator, on the basis of the aforesaid thermodynamic model, lower than a pre-determined threshold value in the region of −25 to −30° C.

3. An internal-combustion engine designed to operate selectively with gasoline or with gas, wherein it comprises electronic control, means programmed in such a way as to set under way a control process according to claim 1.

* * * * *